(12) United States Patent
Cattaneo et al.

(10) Patent No.: US 7,054,349 B2
(45) Date of Patent: May 30, 2006

(54) METHOD AND DEVICE FOR DECODING AN INCIDENT PULSE SIGNAL OF THE ULTRA WIDEBAND TYPE, IN PARTICULAR FOR A WIRELESS COMMUNICATION SYSTEM

(75) Inventors: Chiara Cattaneo, St. Genis-Pouilly (FR); Didier Helal, St. Julien en Genevois (FR); Thierry Arnaud, Poisy (FR); Fritz Lebowsky, Palo Alto, CA (US); Régis Cattenoz, Annemasse (FR)

(73) Assignees: STMicroelectronics N.V., Amsterdam (NL); STMicroelectronics SA, Montrouge (FR)

( * ) Notice: Subject to any disclaimer, the term of this patent is extended or adjusted under 35 U.S.C. 154(b) by 786 days.

(21) Appl. No.: 10/255,741

(22) Filed: Sep. 26, 2002

(65) Prior Publication Data

US 2003/0058963 A1 Mar. 27, 2003

(30) Foreign Application Priority Data

Sep. 27, 2001 (EP) .................................. 01402498

(51) Int. Cl.
*H04B 1/707* (2006.01)
(52) U.S. Cl. ........................ 375/130; 375/150; 375/367
(58) Field of Classification Search ................ 375/130, 375/147–150, 256, 343, 367
See application file for complete search history.

(56) References Cited

U.S. PATENT DOCUMENTS

| 5,677,927 | A | 10/1997 | Fullerton et al. ........... 375/200 |
|---|---|---|---|
| 5,832,035 | A | 11/1998 | Fullerton ..................... 375/210 |
| 5,901,172 | A | 5/1999 | Fontana et al. ............. 375/200 |
| 6,763,057 | B1 * | 7/2004 | Fullerton et al. ........... 375/141 |
| 6,965,630 | B1 * | 11/2005 | Miller et al. ................. 375/130 |
| 6,975,665 | B1 * | 12/2005 | McCorkle .................... 375/130 |
| 2001/0053175 | A1 * | 12/2001 | Hoctor et al. ............... 375/130 |

OTHER PUBLICATIONS

Dickson et al., An Application Specific Integrated Circuit Implementation of a Multiple Correlator for UWB Radio Applications, Milcom 1999, IEEE Military Communications Conference Proceedings (Cat. No. 99CG36341), Proceedings of Conference on Military Communications (Milcom 99), Atlantic City, NJ, USA, ISBN: 0-7803-5538-5.
Win et al., Ultra-Wide Bandwidth Time-Hopping Spread-Spectrum Impulse Radio for Wireless Multiple-Access Communications, IEEE Transactions on Communications, IEEE Inc. New York, US, vol. 48, No. 4, Apr. 2000, pp. 679-691, XP000932191.

(Continued)

*Primary Examiner*—Don N. Vo
(74) *Attorney, Agent, or Firm*—Lisa K. Jorgenson; Allen, Dyer, Doppelt, Milbrath & Gilchrist, P.A.

(57) ABSTRACT

An incident pulse signal of the ultra wideband type conveys digital information that is coded using pulses having a known theoretical shape. A decoding device includes an input for receiving the incident signal, and for delivering a base signal. A comparator receives the base signal and delivers an intermediate signal representative of the sign of the base signal with respect to a reference. A sampling circuit samples the intermediate signal for delivering a digital signal. A digital processing circuit correlates the digital signal with a reference correlation signal corresponding to a theoretical base signal arising from the reception of a theoretical pulse having the known theoretical shape.

39 Claims, 14 Drawing Sheets

OTHER PUBLICATIONS

Bhushan et al.; "Photonic Sampling and Time Stretching for Analog-to-Digital Conversion", Jul. 27-28, 1999 Conference Publication No. 466 @ IEE 1999; p. 1-4.

Utata et al.; "High-Speed Sample and Hold Using Low Temperature Grown GaAs MSM Switches for Photonic A/D Conversion"; CLEO 2001, p. 66-67.

Walden; "Analog-to-Digital Converter Survey and Analysis", HRL Laboratories LLC, Malibu, CA; Publication No. XP-000824301; pp. 539-550.

Kahrs; "50 Years of RF and Microwave Sampling", Digital Object Identifier 10.1109/TMTT.2002.806934; IEEE Transactions on Microwave Theory and Techniques, vol. 51, No. 6, Jun. 2003; pp. 1787-1805.

* cited by examiner

METHOD AND DEVICE FOR DECODING AN INCIDENT PULSE SIGNAL OF THE ULTRA WIDEBAND TYPE, IN PARTICULAR FOR A WIRELESS COMMUNICATION SYSTEM

FIELD OF THE INVENTION

The present invention relates to radio frequency technology, and more particularly, to the decoding of an incident pulse signal of the ultra wideband type conveying coded digital information. The invention advantageously applies to the transmission of such information within a local wireless transmission network.

BACKGROUND OF THE INVENTION

Ultra wideband technology is distinguished from narrowband and spread spectrum technologies in the sense that the bandwidth of an ultra wideband type signal is typically between about 25% to 100% of the central frequency. Moreover, instead of transmitting a continuous carrier modulated with information or with information combined with a spreading code, which determines the bandwidth of the signal, ultra wideband technology involves transmission of a series of very narrow pulses. For example, these pulses may take the form of a single cycle having a pulse width of less than 1 ns. These pulses are extremely short in the time domain, and when transformed into the frequency domain, produce the ultra wideband spectrum that is characteristic of UWB technology.

In UWB technology, the information on the signal can be coded, for example, by a modulation technique called pulse position modulation (PPM). In other words, the information coding is carried out by varying the instant of transmission of individual pulses. More specifically, the pulse train is transmitted at a frequency that can be as much as several tens of MHz. Each pulse is transmitted in a window of predetermined length, such as 50 ns, for example. Compared to a theoretical position of transmission, the pulse is then advanced or delayed, enabling a 0 or a 1 to be coded. More than two values can also be coded by using more than two positions offset relative to the reference position. It is even possible to superimpose a BPSK modulation on this modulation.

On receipt of the transmitted signal, it is therefore necessary to decode these pulses so as to determine the value of the digital information conveyed. This decoding is essentially performed in an analog manner by using an analog correlator. This requires a relatively complex hardware implementation. Moreover, the correlation system is assigned to a fixed position within each pulse transmission window. Consequently, the number of correlation chains must be equal to the number of position modulation levels.

Furthermore, such an architecture requires a precise synchronization to find the right position modulation and the correct polarity of the various symbols. This synchronization is performed by very complex software, since only a limited number of observations are possible. In addition, the precision of the clock, which is typically a few picoseconds, is a very constraining parameter. This is based upon the technology and the current consumed using the technology.

SUMMARY OF THE INVENTION

The invention proposes a device for decoding an incident pulse signal of the ultra wideband type conveying digital information coded using pulses of a known theoretical shape.

According to a general characteristic of the invention, the device comprises input means for receiving the incident signal and for delivering a base signal. The input means may include an antenna, for example. Preprocessing means receive the base signal and delivers an intermediate signal representative of the sign of the base signal with respect to a reference. The reference may be zero volts, for example.

The device preferably further comprises means of sampling the intermediate signal for delivering a digital signal, and digital processing means comprising synchronization means and decoding means for correlating the digital signal with a reference correlation signal. The reference correlation signal corresponds to a theoretical base signal arising from the reception of at least one theoretical pulse having the known theoretical shape.

In other words, the invention enables an ultra wideband type pulse to be detected using the sign of the received signal, sampled and then correlated with a predetermined digital correlation signal. In addition to the use of a binary signal representative of the sign of the incident signal for detecting pulses, the invention provides for all the processing to be carried out digitally, which simplifies the hardware implementation of the device. The processing, in particular, includes the detection, synchronization and decoding of the pulses.

Furthermore, in the prior art, which uses an analog approach, either the information located outside of the instants of capture is lost (for example, in the case of position modulation), or the pulses are detected globally (for example, in the case of a BPSK modulation). However, according to the invention, it is possible to perform a continuous sampling of the sign of the signal with a finer resolution than the width of the pulses, and to choose the best sampling instants to carry out the digital processing, and in particular, the correlation.

In addition, in the wireless communication networks domain, the terminals generally use Rake receivers. A Rake receiver includes several "fingers" assigned to the various paths of a multi-path transmission channel. Therefore, when an analog approach is used for detecting UWB pulses, parts of the receive chain must then be duplicated as many times as there are fingers.

However, according to the invention, the continuous sampling of the sign of the signal allows for a continuous observation of the signal, and multiple paths can then be detected in a multi-path environment without duplicating the receive chain. Moreover, according to the invention, the synchronization procedure is simplified in comparison to the algorithms proposed in the prior art. Specifically, by virtue of the possibility of obtaining continuous observations, it is only necessary to perform a correlation with a synchronization header comprising a predetermined synchronization code.

According to an embodiment of the invention, the sampling means comprise serial-to-parallel conversion means for successively delivering at a predetermined delivery frequency Fe, groups of N samples in parallel. This corresponds to an effective sampling frequency of the intermediate signal equal to N*Fe.

By way of example, when the pulses have a central frequency of a few GHz, the effective sampling frequency can be greater than 10 GHz. In addition, the fact that serial-to-parallel conversion means are used allows a clock signal at a frequency Fe (for example, a few hundreds of MHz) to be used, and an effective sampling frequency on the order of 20 GHz or higher can be obtained. Current analogto-digital converters cannot achieve this. N may be an integer power of 2, such as 7, for example.

The serial-to-parallel conversion means advantageously comprise a programmable clock circuit receiving a base clock signal having the frequency Fe and delivers N elementary clock signals all having the same frequency Fe but temporally shifted by 1/N*Fe with respect to each other. N flip-flops receive at their input the intermediate signal, and are respectively controlled by the N elementary clock signals. The N flip-flops respectively deliver the N samples. The conversion means further comprise an output register controlled by the base clock signal for storing the N samples delivered by the N flip-flops, and for delivering them in parallel at the delivery frequency.

The programmable clock circuit preferably comprises a digital phase-locked loop including a programmable ring oscillator delivering the N elementary clock signals, and is controlled from a control circuit receiving the respective outputs of N flip-flops. These N flip-flops receive the base clock signal and are respectively controlled by the N elementary clock signals.

The use of a digital phase-locked loop combined with the serial-to-parallel conversion means allows a precision greater than a few tens of picoseconds to be obtained for the mutual phase shifts (in the time domain) of the N elementary clock signals. Thus, according to the invention, it is possible to detect the instant of arrival of a pulse with a resolution equal to the precision of the N elementary clock signals.

The sampling means, and in particular, the digital phase-locked loop, are advantageously implemented in CMOS technology. In particular, this allows the sampling means and the digital processing means to be placed in a standby mode for predetermined time intervals. In other words, the system can easily be switched on and off, resulting in significant power savings.

According to an embodiment of the invention, the reference correlation signal is made up of reference samples. The digital processing performed by the synchronization means and by the decoding means comprise a sliding correlation between the samples of the digital signal which are delivered by the sampling means and the reference samples.

The information is conveyed within frames each comprising a synchronization header comprising at least one segment of length Ts containing a synchronization code formed of several theoretical pulses having the known theoretical shape. The digital processing performed by the synchronization means during the reception of a synchronization header then comprises, for example, a sliding correlation between N5 reference samples and a set of N3 samples of a digital signal which are delivered by the sampling means.

The N3 samples correspond to a signal duration greater than Ts in such a way as to take account of an estimated length of the transmission channel. Moreover, in this synchronization phase, the N5 reference samples correspond to a signal length Ts and to a theoretical base signal arising from the reception of the synchronization code. The synchronization means then perform a detection of the synchronization code, possibly with circular permutations of this code, on the basis of the result of the correlation.

The result of the correlation may include detection of a maximum, or the detection of overshooting the reference threshold (0, for example). Generally, the synchronization header comprises several segments of the same length Ts, each containing identical synchronization codes. The synchronization means then furthermore comprise means for performing a series of coherent integrations of the digital signal, thereby making it possible, in particular, to circumvent noise.

Although not indispensable, it is preferable for the device to also comprise means for estimating the response of the transmission channel. The estimation means also perform a digital processing comprising a correlation of the digital signal with the reference correlation signal. This makes it possible to have a good approximation of the response of the transmission channel, and this will subsequently facilitate the decoding of the information.

Thus, according to an embodiment in which each frame furthermore comprises a second part containing at least one pulse having a known polarity and a known time shift with respect to the synchronization header, the digital processing performed by the channel estimation means comprise a set of samples of the digital signal beginning at an instant separated from the synchronization header by the time shift. The time shift may be a predetermined number N4 of samples of the digital signal which are delivered by the sampling means. A sliding correlation is performed between N2 reference samples and the set of N4 samples of the digital signal for obtaining a vector of N4 reference correlation values. In this case, the N2 reference samples (N2=9, for example) correspond to a theoretical base signal arising from the reception of a single theoretical pulse.

The second part of the frame may comprise several pulses having a known polarity spaced regularly apart by time intervals corresponding to N4 samples of the digital signal. The channel estimation means then preferably further comprise means for performing a series of coherent integrations of the digital signal. This also makes it possible to circumvent noise. This vector of N4 reference correlation values will advantageously be used in the decoding of the data.

More precisely, when the frame comprises a third part containing so-called "useful" pulses, that is, one which comprises information on the final user of the wireless communication system, each pulse has a known reference time position in the frame. The digital processing performed by the decoding means advantageously comprise, beginning at the assumed instant of reception of a useful current pulse, the storage of N4 samples of the digital signal. A sliding correlation between the N4 stored samples and the N2 reference samples obtain a vector of N4 useful correlation values which are associated with this current useful pulse. The comparison of this useful correlation vector with the vector of N4 reference correlation values, or possibly when the pulses are coded with a pulse position modulation (PPM) with this reference vector temporally delayed or advanced by a predetermined shift are used in the PPM modulation.

The subject of the invention is also directed to a terminal of a wireless communication system incorporating a decoding device as defined above.

The subject of the invention is also directed to a method for decoding an incident pulse signal of the ultra wideband type conveying digital information coded using pulses of a known theoretical shape. The method comprises at least one synchronization phase and decoding phase. The synchronization and decoding phases may be interleaved.

According to a general characteristic of the invention, the decoding process comprises receiving the incident signal so as to obtain a base signal, and sampling an intermediate signal representative of the sign of the base signal with respect to a reference so as to obtain a digital signal. The synchronization phase and the decoding phase comprise digital processing of the digital signal. This comprises a correlation of the digital signal with a reference correlation signal corresponding to a theoretical base signal arising from the reception of at least one theoretical pulse having the known theoretical shape.

According to a mode of implementation, the sampling comprises a serial-to-parallel conversion for successively delivering at a predetermined delivery frequency Fe groups of N samples in parallel. This corresponds to an effective sampling frequency for the intermediate signal equal to N*Fe. The pulses may have a central frequency of a few GHz, for example. The effective sampling frequency may be greater than 10 GHz. N may be an integer power of 2, and the effective sampling frequency is, for example, on the order of 20 GHz. The delivery frequency Fe may be on the order of 200 MHz.

BRIEF DESCRIPTION OF THE DRAWINGS

Other advantages and characteristics of the invention will become apparent on examining the detailed description of embodiments and modes of implementation, which are in no way limiting, and the appended drawings, in which, FIG. 1 diagrammatically illustrates an incident signal of the ultra wideband type in accordance with the present invention.

DETAILED DESCRIPTION OF THE PREFERRED EMBODIMENTS

Figure 1:
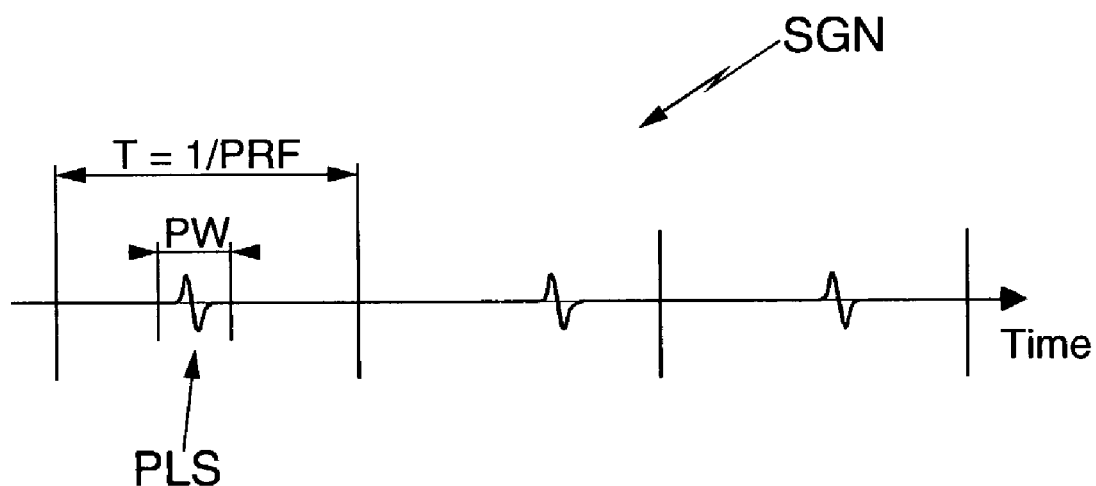
Figure 2:
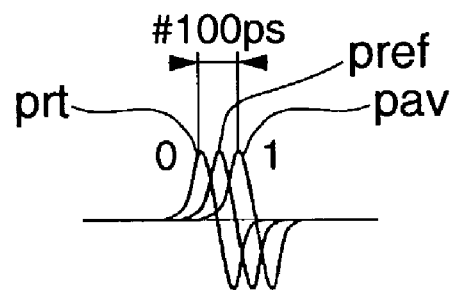
FIG. 2 illustrates in greater detail but again diagrammatically a pulse position modulation (PPM) coding of a bit in accordance with the present invention.

In FIG. 1, the reference SGN designates an initial pulse signal of the ultra wideband type including pulses PLS having a known theoretical shape. More specifically, these pulses PLS have a predetermined time-domain width PW, which is typically less than 1 ns and on the order of 360 picoseconds, for example. The successive pulses PLS are each contained in successive time windows of length T equal to the inverse of the pulse repetition frequency (PRF). As a guide, the length T of each time window is, for example, equal to 50 ns. The position of each pulse in a time window can vary from one window to another according to a pseudo-random code. Moreover, when the signal carries information coded using a pulse position modulation (PPM), the pulse can, as illustrated in FIG. 2, be slightly ahead (pav) or slightly delayed (prt) relative to the reference position (pref) of the pulse in the window, depending on the value 0 or 1 of the information transmitted.

The pulses PLS have characteristics of an ultra wideband type pulse in the sense that the ratio of the bandwidth of the pulse at half-power to the central frequency is greater than ¼. As a guide, the central frequency of a pulse can vary between 2 and 4 GHz.

Figure 5:
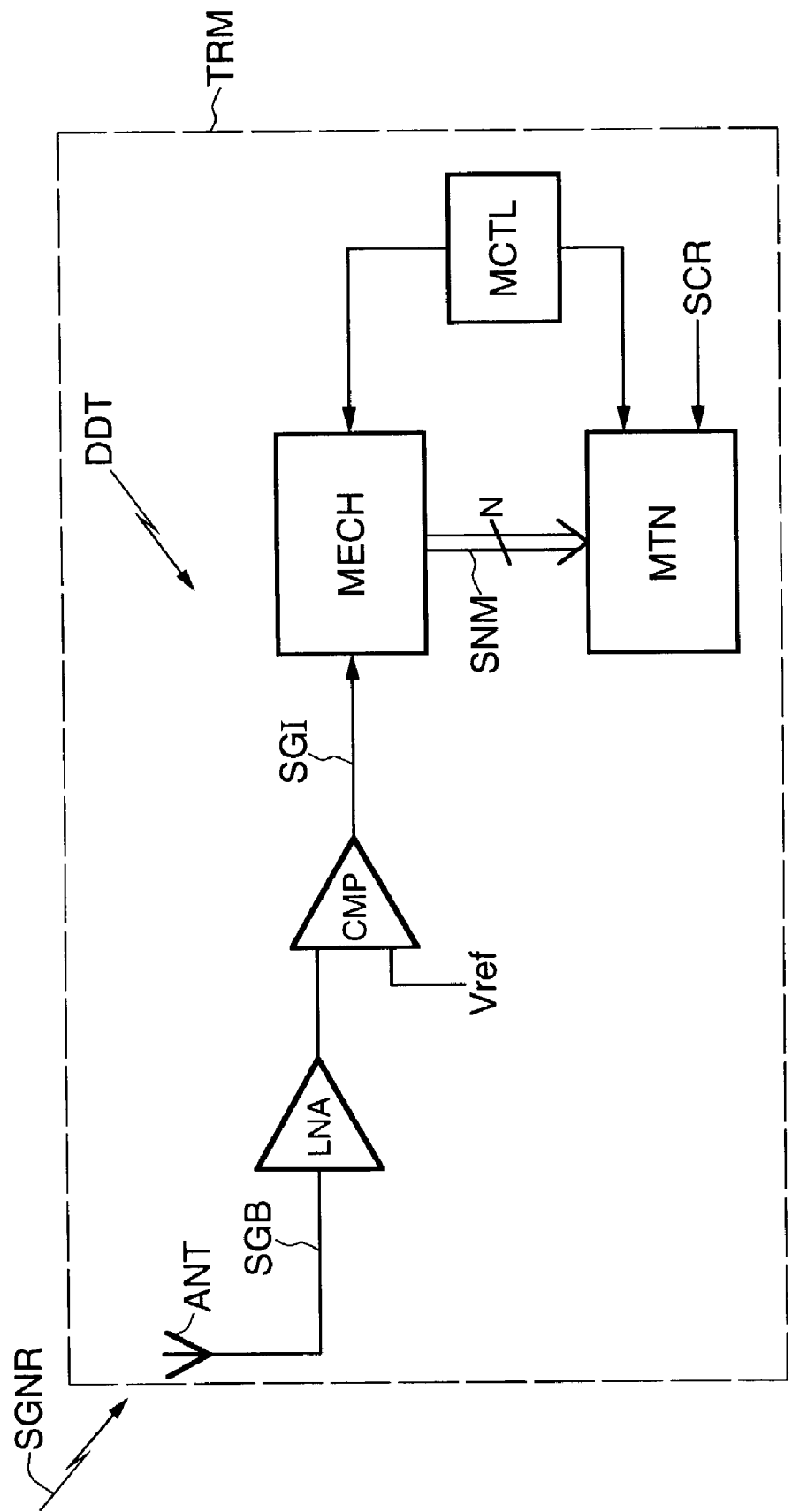
FIG. 5 diagrammatically illustrates an embodiment of a detection device in accordance with the present invention.

The detection device DDT according to the invention, an embodiment of which is illustrated in FIG. 5, enables the presence or absence of pulses in the signal to be detected. When a pulse is present, the detection device DDT detects its instant of arrival and its polarity. The device DDT particularly allows the decoding of the binary data after having performed a synchronization and a channel estimation. This device can, for example, be incorporated in a terminal TRM of a local area network type wireless communication system.

Figure 3:
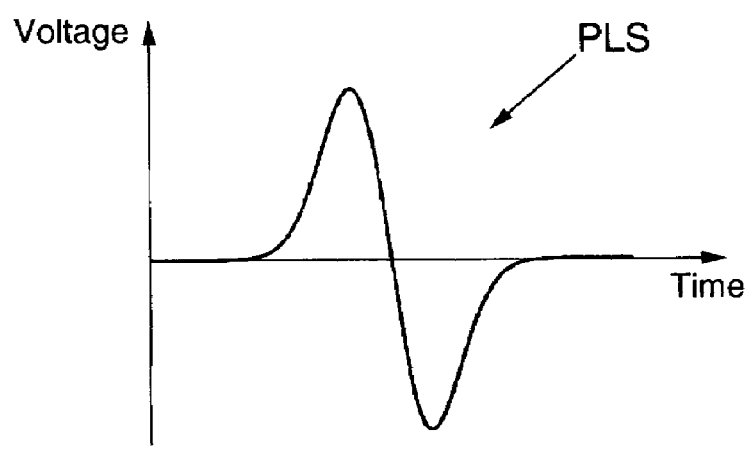
FIG. 3 illustrates in greater detail one of the pulses of the incident signal of FIG. 1.
Figure 4:
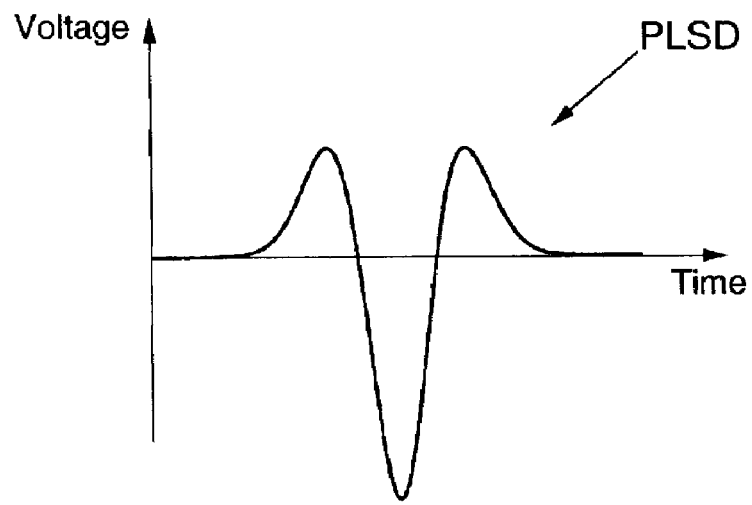
FIG. 4 illustrates in greater detail one of the pulses of the base signal resulting from the reception of the incident signal by the reception system in accordance with the present invention.

More specifically, this device DDT includes, in particular but non-limited to the illustrated application, an antenna ANT to receive the incident signal SGNR resulting from the transmission of the signal SGN over a transmission channel which may be a multi-path channel. The antenna ANT forms the input means which delivers a base signal SGB from the incident signal SGNR. The base signal SGB is also a pulse signal of the ultra wideband type. After passing through the antenna ANT, the shape of the pulses PLSD making up this signal SGB is illustrated in FIG. 4. This shape is different from the shape of the pulses PLS illustrated in FIG. 3.

In other words, the pulse PLSD is the theoretical response of the system on receiving a pulse PLS. Of course, this theoretical response varies according to the characteristics of the reception means. The base signal SGB is then amplified using low noise amplification means LNA. The output signal of the amplifier LNA is compared with a reference voltage Vref (for example, 0 volts) in a comparator CMP. The comparator CMP then delivers an intermediate signal SGI representative of the sign of the base signal SGB, and consequently of the sign of the incident signal relative to the reference Vref.

The intermediate signal SGI is sampled in sampling means MECH. The sampling means MECH, as will be seen in more detail below, delivers successive groups of N samples. All these samples are processed in the digital processing means comprising correlation means for correlating the digital signal SNM delivered by the sampling means with a predetermined digital correlation signal SCR. The result of this correlation enables the possible presence of a pulse to be detected, as well as sychronization, channel estimation and decoding to be carried out.

Figure 6:
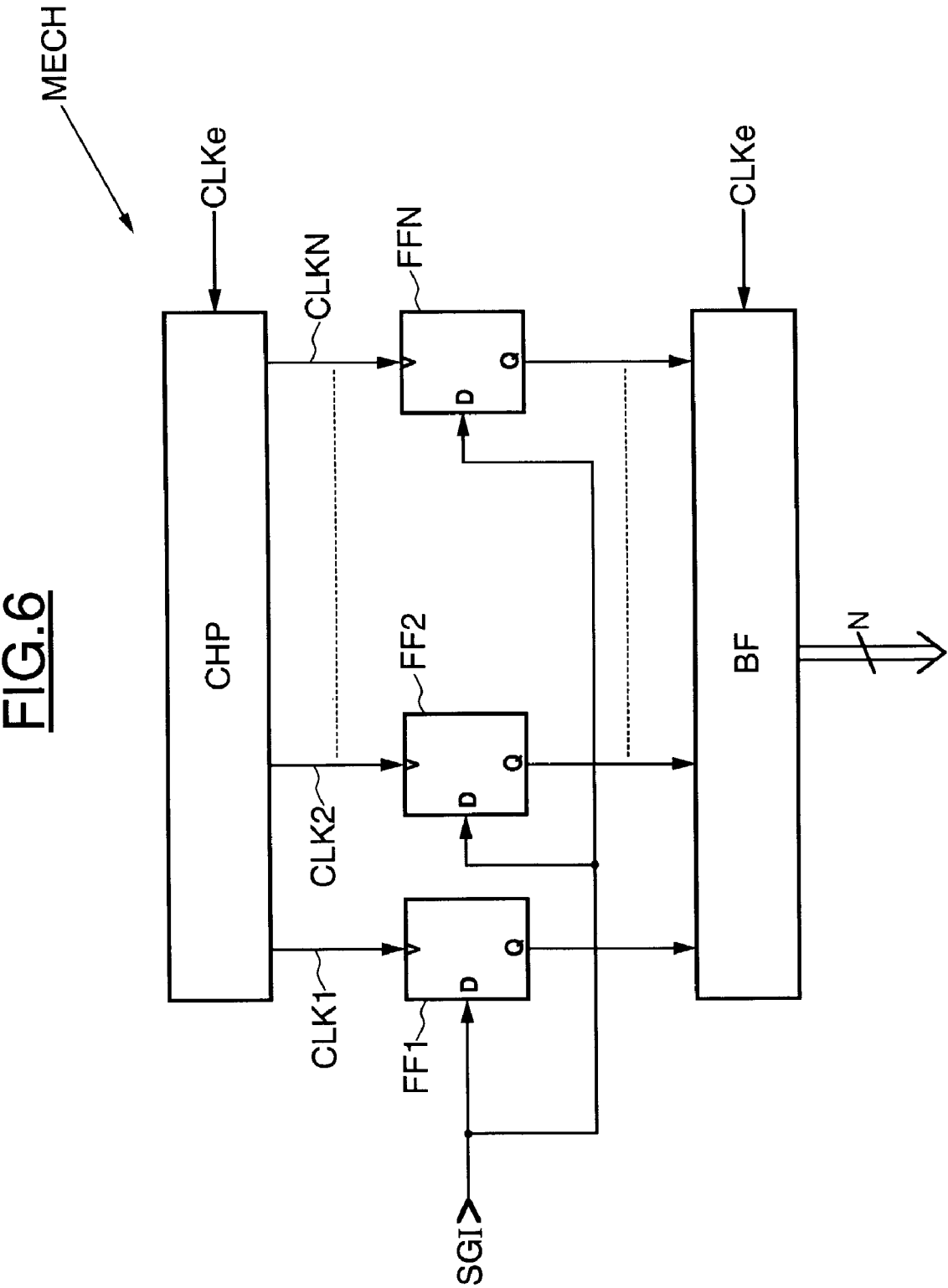
FIGS. 6 and 7 illustrate in greater detail but still diagrammatically an embodiment of the sampling means of the device of FIG. 5.

As the central frequency of the pulses of the signal can be on the order of several GHz, the sampling frequency of the digital signal must be very high, such as greater than 10 GHz, for example. A method which is particularly straightforward to implement for sampling a signal at 10 GHz involves using serial-to-parallel conversion means, as illustrated in FIG. 6.

More specifically, the serial-to-parallel conversion means will successively deliver at a predetermined delivery frequency Fe, for example, on the order of 200 MHz, groups of N samples in parallel. This corresponds to an effective sampling frequency of the intermediate signal equal to N*Fe. Thus, N can be, for example, chosen to be equal to $2^m$, where m may be equal to 7, and this leads to groups of 128 samples being obtained. The effective sampling frequency will be greater than 20 GHz.

In terms of hardware, the serial-to-parallel conversion means comprise a programmable clock circuit CHP receiving a base clock signal CLKe having the frequency Fe and delivering N elementary clock signals CLK1–CLKN all having the same frequency Fe but shifted temporally by 1/N*Fe with respect to each other. Thus, as a guide, these clock signals may be shifted temporally with respect to each other by about 50 picoseconds, for example.

The serial-to-parallel conversion means also comprise N D-type flip-flops, respectively referenced FF1–FFN. These flip-flops are respectively controlled by N elementary clock signals CLK1–CLKN, and they all receive at their input the intermediate signal SGI from the comparator CMP.

The intermediate signal SGI is sampled in synch with the successive rising edges of the various elementary clock signals CLK1–CLKN, and the N successive samples will be stored in an output register BF controlled by the base clock signal CLKe. At each rising edge of this base clock signal CLKe, the N samples will be delivered in parallel. The rising edges are spaced by an interval Te representing the period of the base clock signal.

Figure 7:
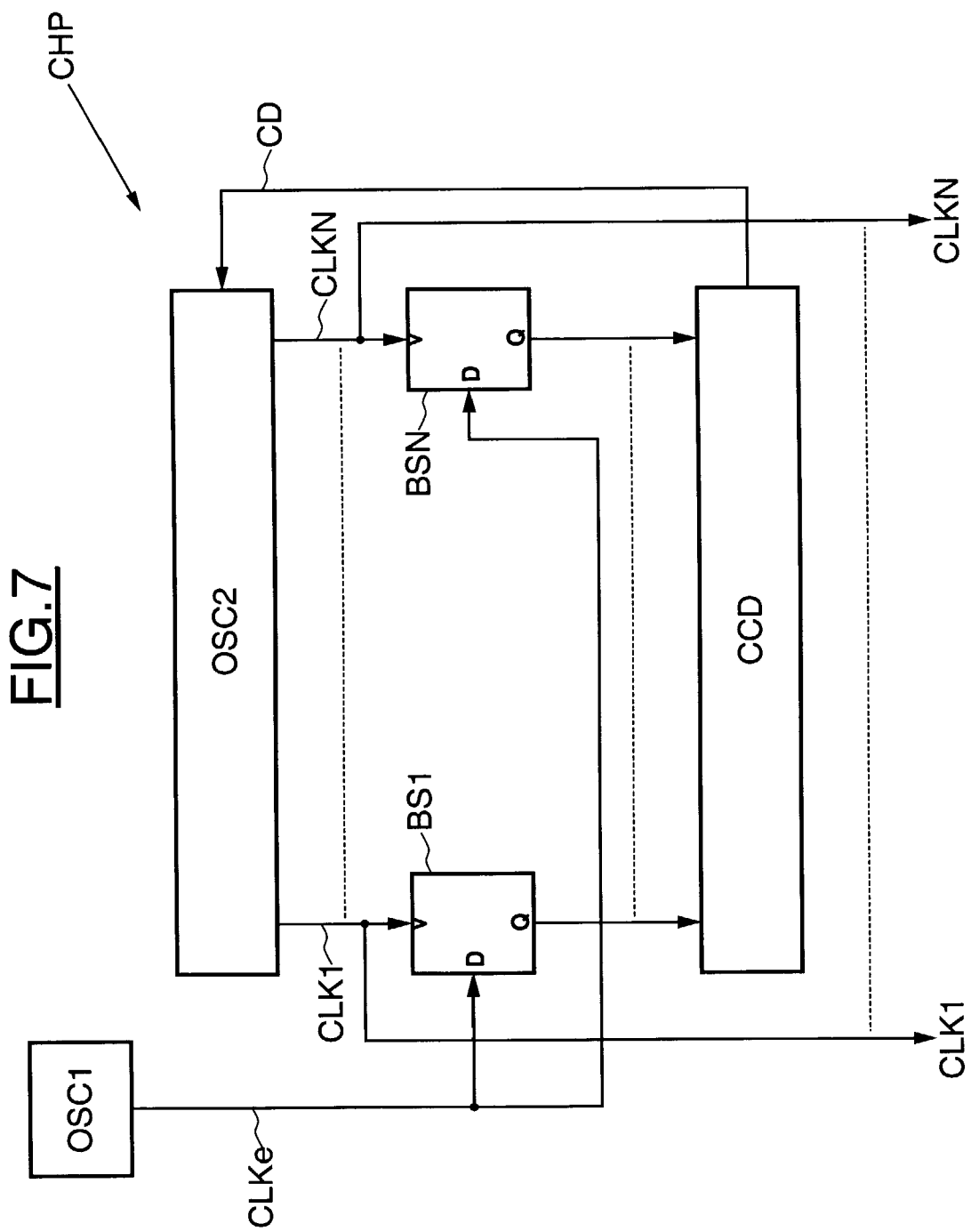
Figure 8:
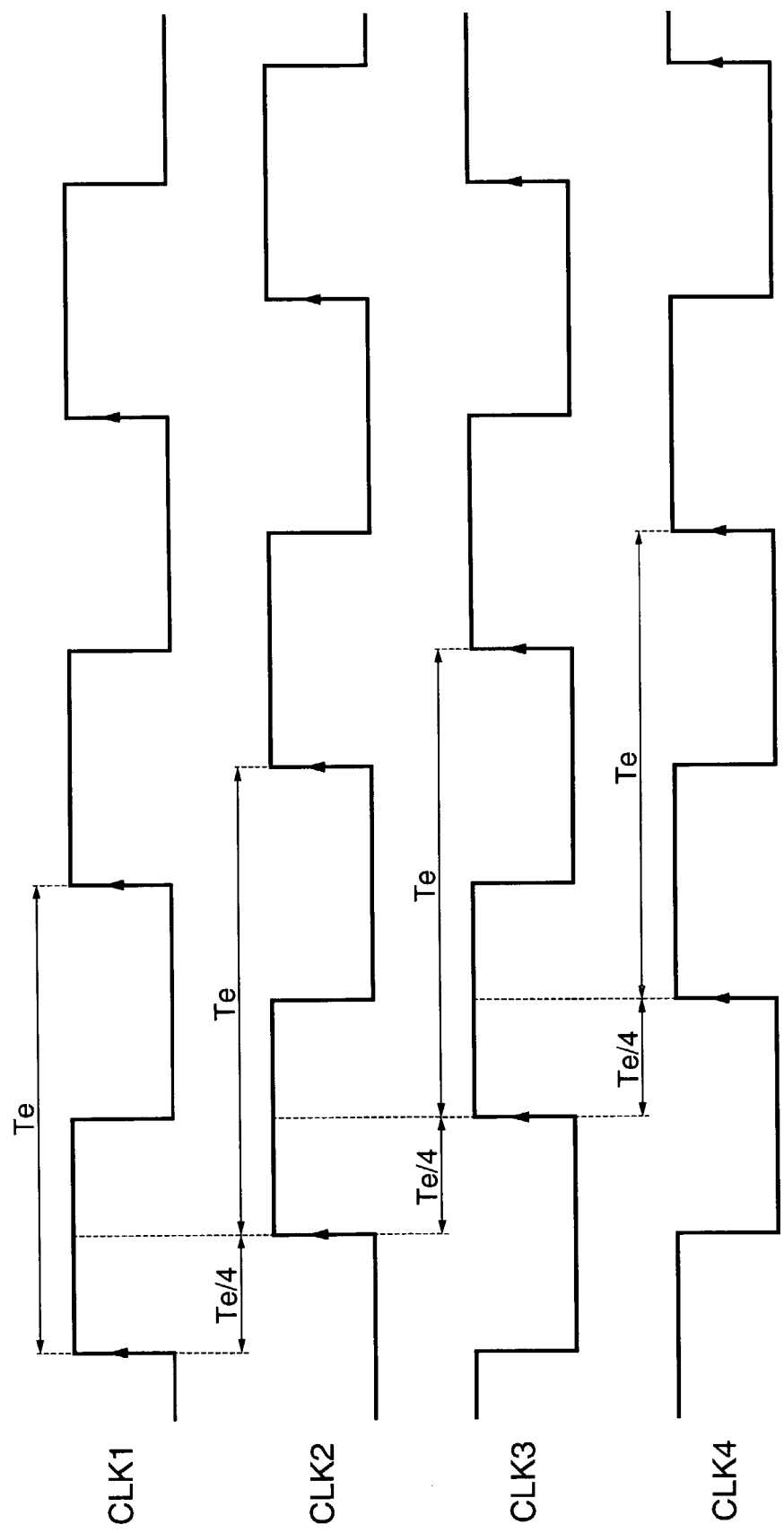
FIG. 8 represents a timing chart of the various clock signals used in the sampling means in accordance with the present invention.

By way of example, FIG. 8 can be referred to, in which, for simplicity, only four elementary clock signals CLK1–CLK4 (corresponding to N=4) have been represented. As illustrated in FIG. 7, the base clock signal CLKe is one of the elementary clock signals, such as, the signal CLK1, for example.

The programmable clock circuit CHP can be made up of a clock, such as, a quartz clock, for example, and a certain number of delay elements assembled in series at the output of the clock. To this end, the person skilled in the art may refer to European Patent Application No. 843,418.

One of the problems of this very high sampling frequency lies in the fact that the elementary clock signals should be delivered with a very low jitter, for example, on the order of a few picoseconds. This is the reason why it is therefore advantageous that the programmable clock circuit CHP comprises a digital phase-locked loop comprising (FIG. 6), for example, a programmable ring oscillator OSC2 delivering the N elementary clock signals CLK1–CLKN. This ring oscillator is controlled from a control circuit CCD receiving the respective outputs of N flip-flops BS1–BSN. These N flip-flops are respectively controlled by the N elementary clock signals CLK1–CLKN, and receive at their D input the base clock signal CLKe from a conventional quartz oscillator OSC1, for example.

To this end, the person skilled in the art may refer to U.S. Pat. No. 6,208,182 with respect to the control of the ring oscillator. Nevertheless, the general principles thereof will now be reviewed. The control circuit CCD comprise means for comparing samples in pairs, in such a way as to determine if a state transition has occurred in an interval of time separating the two samples. This comparison is made over at least two cycles, which may be consecutive, of the ring oscillator.

This comparison is carried out in such a way that if during the second cycle a comparable state transition is detected in the same interval, the control of the ring oscillator is not modified. If during the second cycle a comparable state transition is detected in a later interval, the period of the ring oscillator is reduced. If during the second cycle a comparable state transition is detected in an earlier interval, the period of the ring oscillator is increased.

Figure 9:
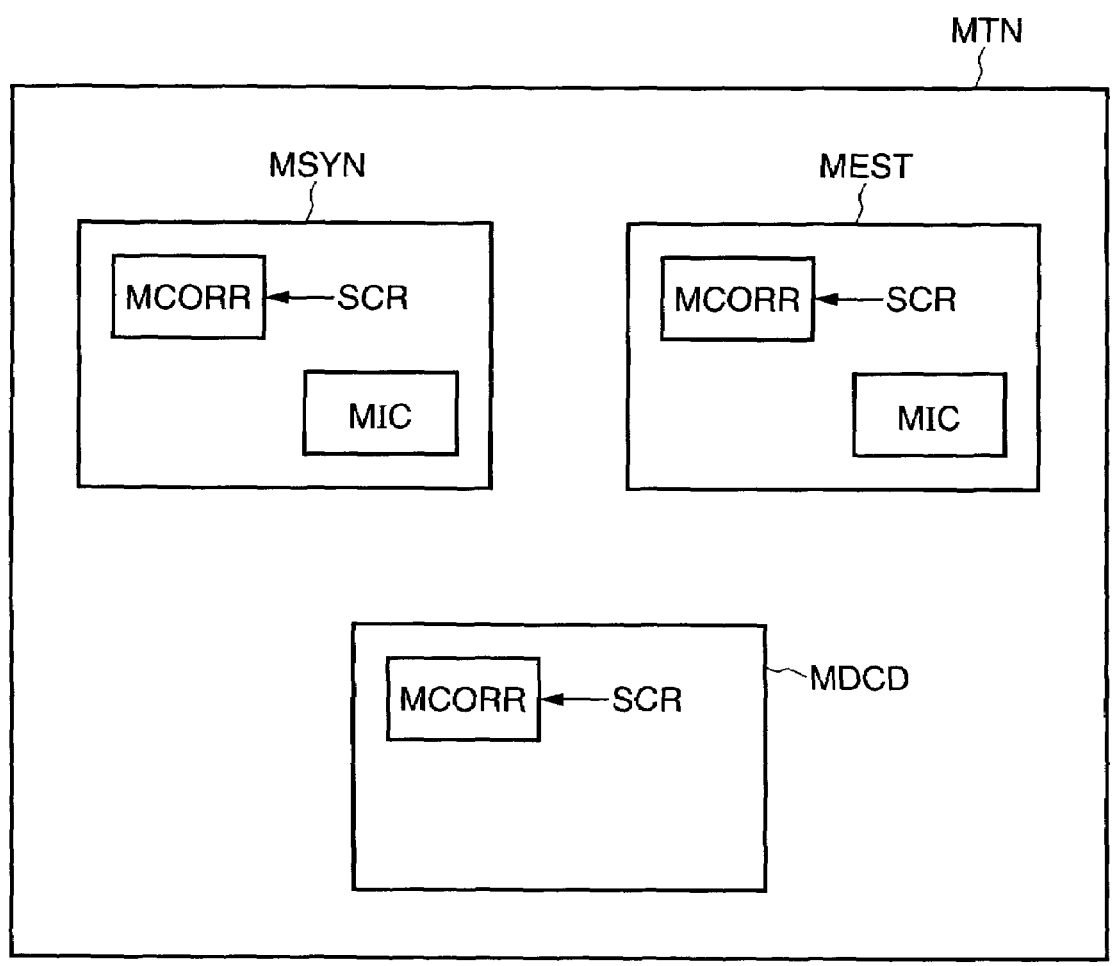
FIG. 9 illustrates in greater detail, but still diagrammatically, an embodiment of the digital processing means of the device of FIG. 5.

Referring now to FIG. 9, the digital processing means MTN comprise synchronization means MSYN, channel estimation means MEST and decoding means for decoding the useful data MDCD. All these means moreover comprise correlation means MCORR for performing a digital correlation of the signal delivered by the sampling means with a reference correlation signal SCR.

In the described example, and because the pulses have a known shape, the reference correlation signal is a reference signal corresponding to the shape of a pulse after it has passed through the input means. More specifically, as illustrated in FIG. 9, the digital reference signal SCR may be, for example, a profile of nine samples for which the general shape corresponds to the general shape of a pulse PLSD. Each sample is separated in time by a distance $\Delta t=1/N*Fe$. The reference signal SCR is therefore, in this case, a block of nine samples respectively having values 111-1-1111. As will be seen below, the reference signal SCR may correspond to several pulses PLSD, and include a larger number of samples. The correlation means MCORR performs a sliding correlation between the digital signal samples delivered by the sampling means and the reference samples of the signal SCR.

Figure 11:
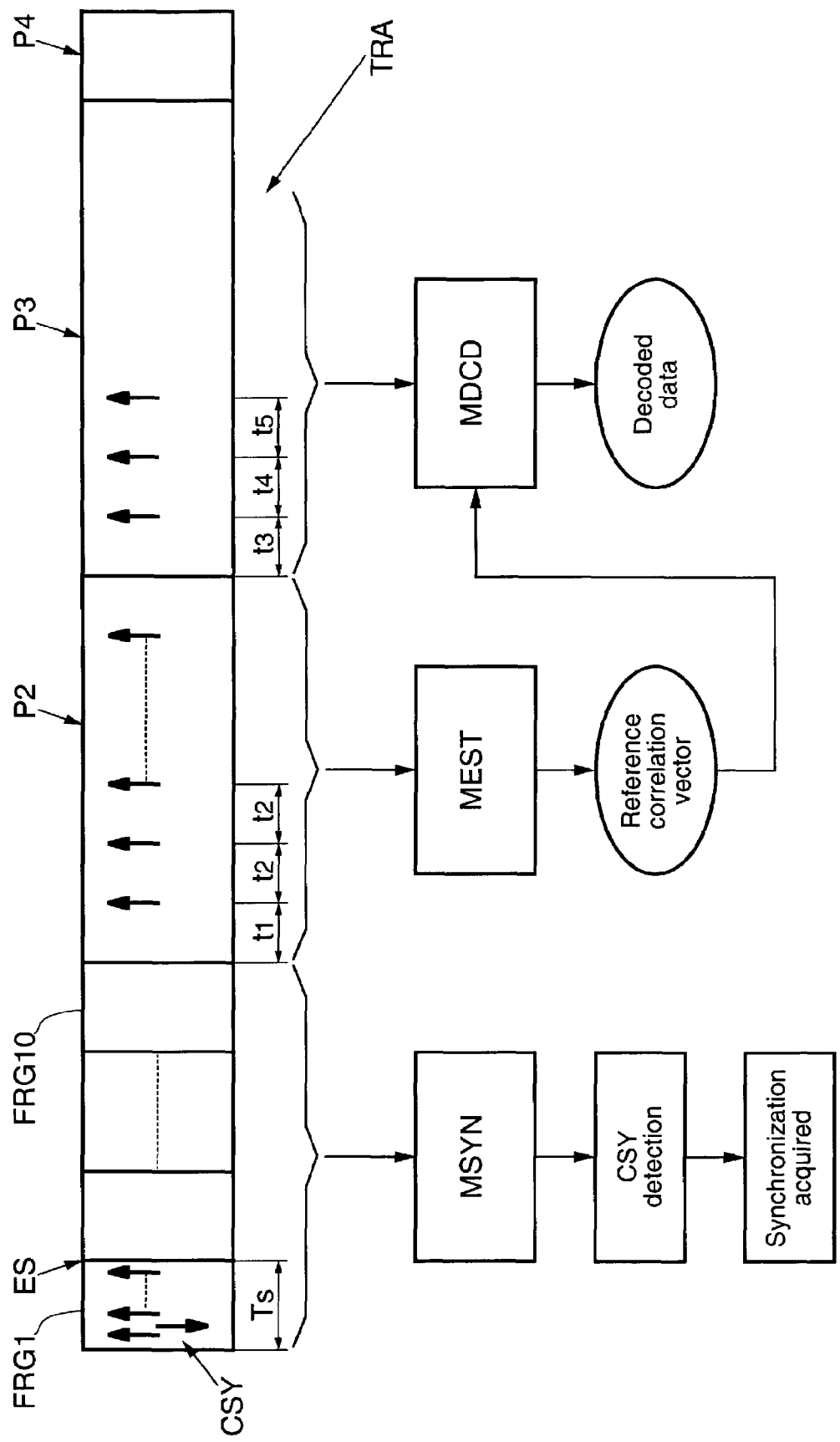
FIG. 11 diagrammatically illustrates the various functions implemented for decoding data conveyed within a transmission frame in accordance with the present invention.

Reference will now be made more particularly to FIG. 11 to describe the synchronization, the channel estimation and decoding of data which is assumed to be conveyed within a frame TRA. This frame TRA comprises a synchronization header ES having, for example, a duration on the order of a few microseconds. The synchronization header ES is subdivided into several segments of identical length Ts, such as ten segments FRG1–FRG10, for example. Each segment $FGR_i$ contains an identical synchronization code CSY composed, for example, of seven pulses having known positions and polarities.

In FIG. 11, the arrows of the code CSY designate the various pulses together with their respective polarities. The length Ts corresponds to a set of N5 samples. The reference correlation signal then comprises N5 samples corresponding to several pulses PLSD forming the synchronization code.

Figure 12:
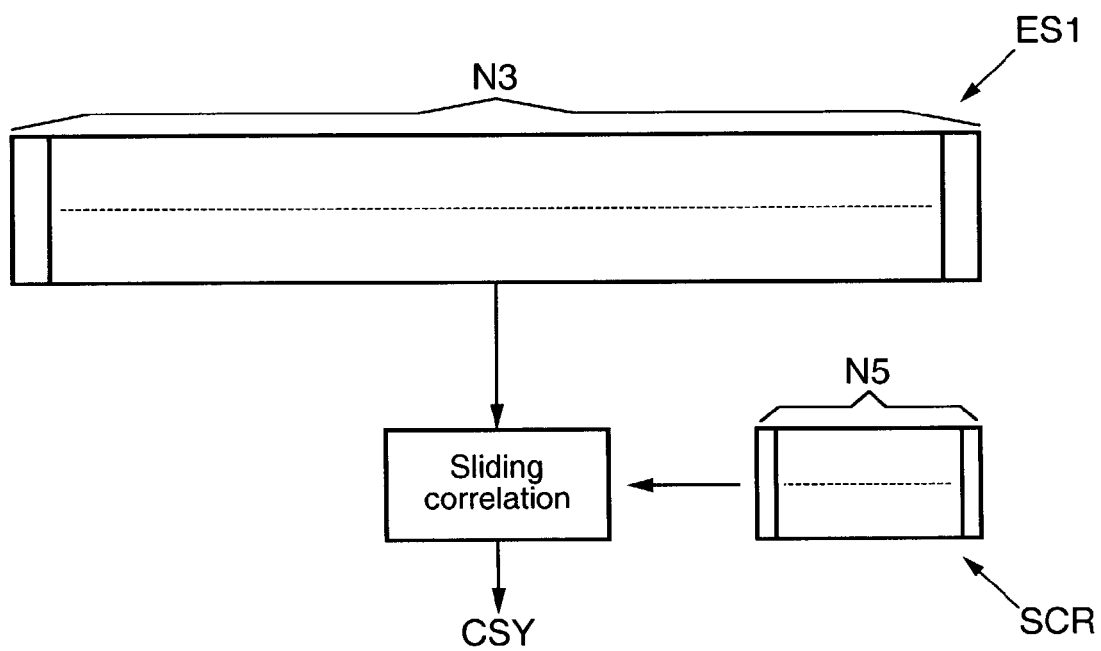
FIGS. 12 and 13 diagrammatically illustrate an implementation of the synchronization and an embodiment of the corresponding means using a reference correlation signal such as, for example, the one illustrated in FIG. 10.

In theory, it would be possible to acquire synchronization by using a single set ES1 of N3 samples delivered by the sampling means (FIG. 12) by performing a sliding correlation between the N3 samples and the N5 samples of the reference correlation signal SCR. Consequently, N3 is greater than N5 and corresponds to a signal length greater than Ts, and may be equal to TS+L, where L is an estimated length for the transmission channel.

The synchronization means MSYN will then detect the various maximums from among the correlation values, and this will make it possible to detect the presence and the instant of arrival of the pulses as well as their polarities according to the sign of these maximum values. Consequently, the means MSYN makes it possible to detect the synchronization code CSY. As a variation, it is possible to detect just the crossings through 0 of all of the correlation values.

It should be noted here that the synchronization code CSY will be detected if the set of N3 samples over which the sliding correlation is performed corresponds to a whole segment of the synchronization header. If, in contrast, this set of N3 samples straddles two consecutive segments, then a circular permutation of the synchronization code will be detected.

Figure 13:
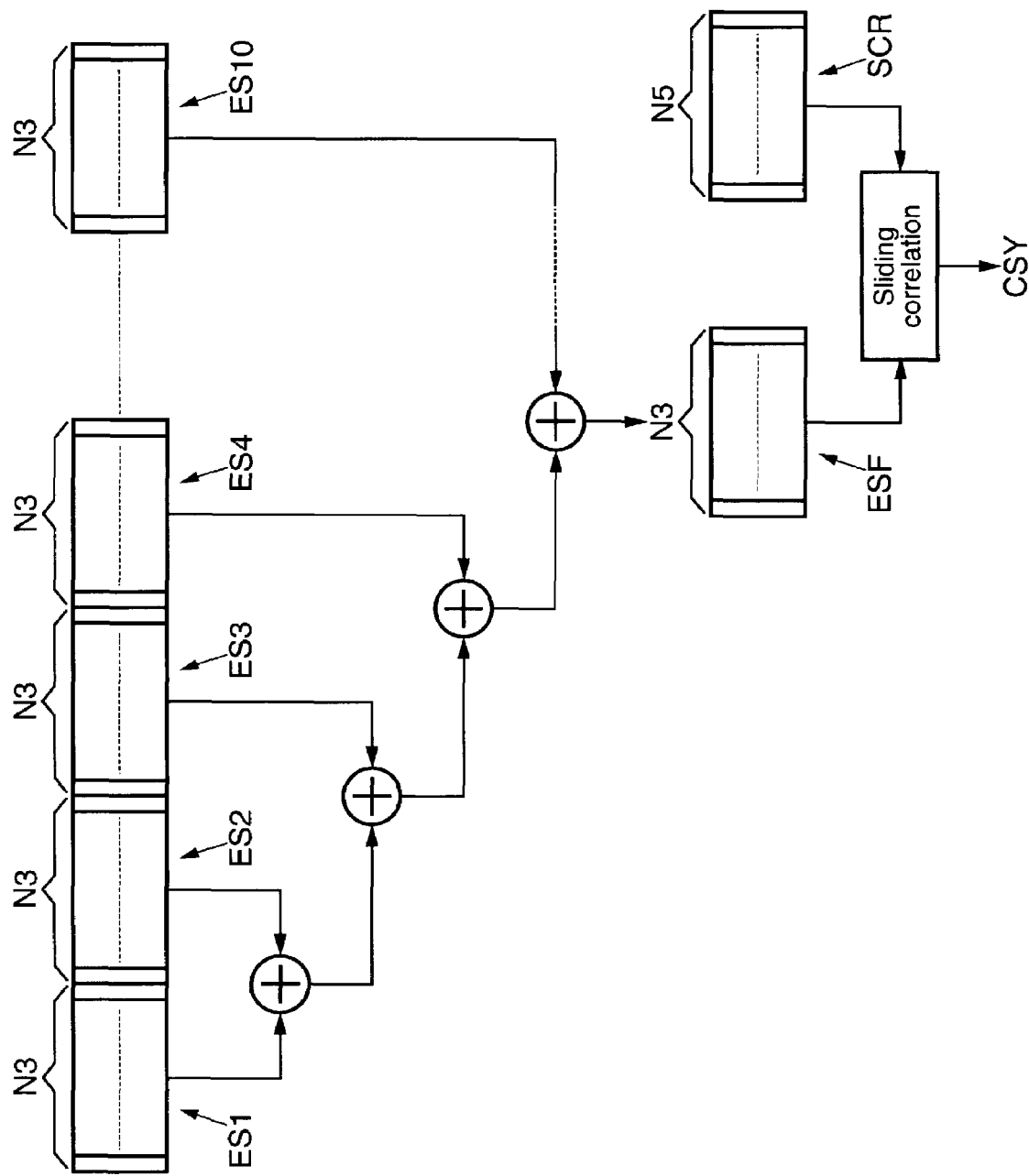

The signal SGNR which arrives on the antenna is noisy. This is why it is preferable for the synchronization means MSYN to furthermore comprise means MIC (FIG. 9) for performing a series of coherent integrations of the digital signal. Such coherent integrations are entirely known by a person skilled in the art. In the present case, as illustrated in FIG. 13, they include performing summations of common samples of the successive sets of N3 samples ES1–ES10 (corresponding in terms of the number of samples to the length of the segments of the synchronization header) so as to obtain in the end a final set ESF of N3 samples on which the correlation means will perform the sliding correlation using the N5 reference samples.

This sliding correlation makes it possible, as indicated above, to detect the synchronization code CSY, possibly with the circular permutations of this code. Once this detection has been performed, the synchronization is acquired and it is then possible to go to the next step of the method which comprises performing an estimation of the impulse response of the channel.

To determine the impulse response of the channel, the channel estimation means MEST will use a second part P2 (FIG. 11) of the frame TRA. This second part P2 in theory contains at least one pulse having a known polarity and a known time shift t1 with respect to the synchronization header. It contains several pulses of known polarities spaced regularly apart by a time interval t2 corresponding to N4 samples of the digital signal.

The value N4 is chosen to correspond substantially to the length of the transmission channel, for example, on the order of 350 nanoseconds. In theory, the presence of a single pulse in the part P2 makes it possible to ascertain the impulse response of the channel.

More precisely, the estimation means MEST then stores, beginning at the instant t1 separated from the end of the synchronization header, which is known since the synchronization has been acquired previously, N4 samples of the digital signal which are delivered by the sampling means. The N4 samples represent the response of the channel to the transmission of the pulse which was sent after a duration t1 after the end of the synchronization header.

Figure 10:
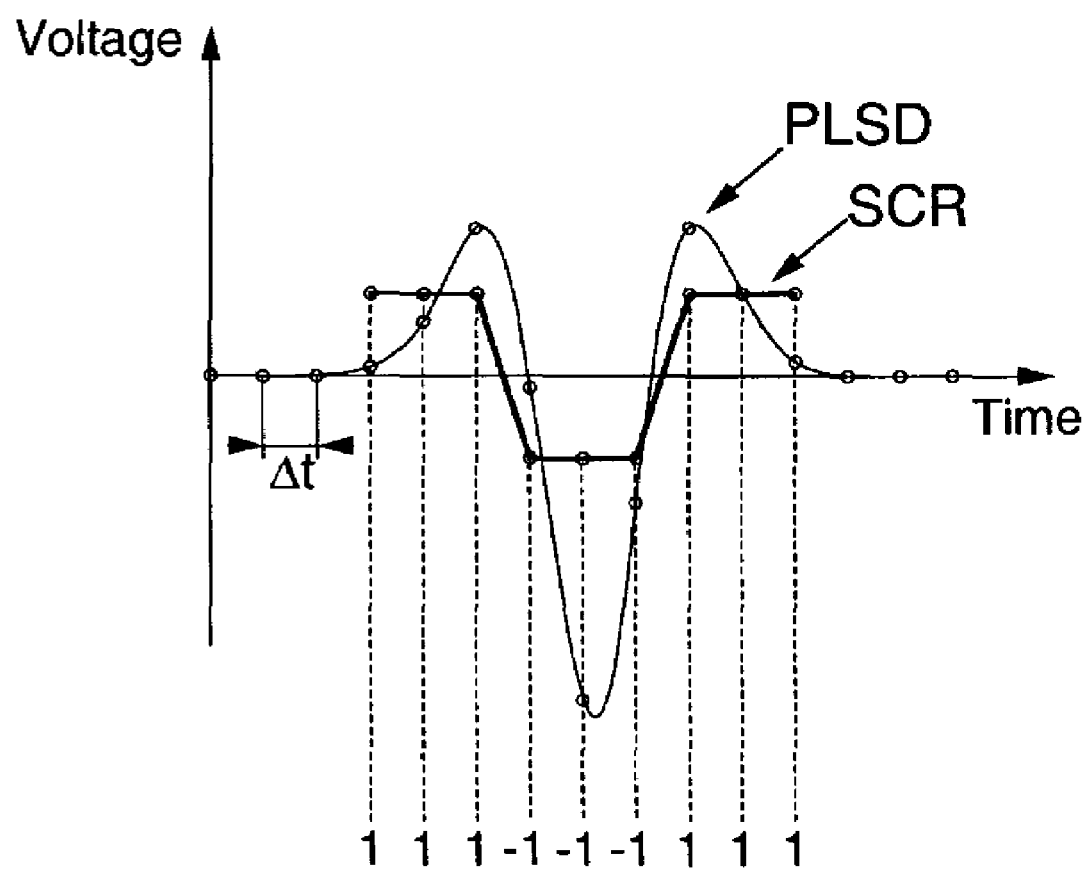
FIG. 10 illustrates a reference correlation signal in accordance with the present invention.
Figure 14:
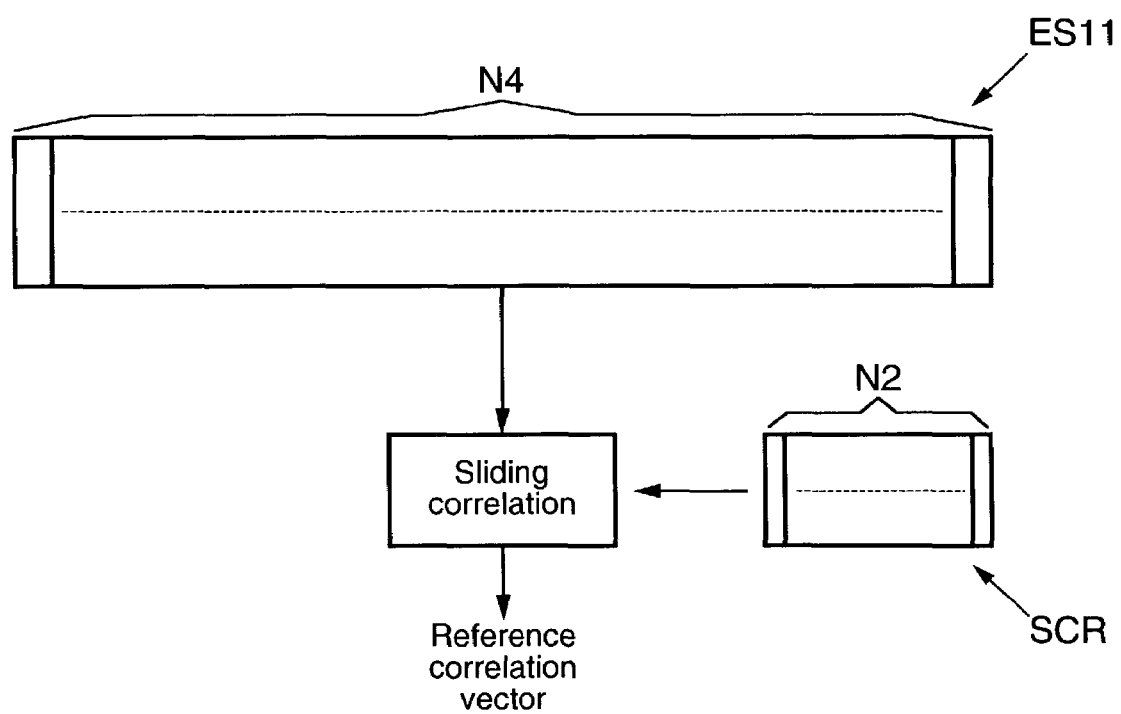
FIGS. 14 and 15 diagrammatically illustrate an implementation of a channel estimation and an embodiment of the corresponding means also using a reference correlation signal such as, for example, the one illustrated in FIG. 10.

As illustrated in FIG. 14, the correlation means of the estimation means performs a sliding correlation between the set ES11 of the N4 stored samples and the N2 reference samples of the reference correlation signal SCR of FIG. 10. This makes it possible to obtain a reference correlation vector having N4 reference correlation values, and it is this vector of the N4 reference correlation values which represents the impulse response of the channel.

More precisely, since N2 is typically much less than N, the correlation means will first perform a first correlation (which is a term by term multiplication) between the N2 reference samples and the first N2 samples of the group of N samples delivered by the sampling means. This will give a first correlation value. Then, every Δt, the N2 reference samples will be shifted by one sample so as to obtain a new correlation value. Also, this sliding correlation will be performed on the set ES11 of N4 samples of the digital signal.

Figure 15:
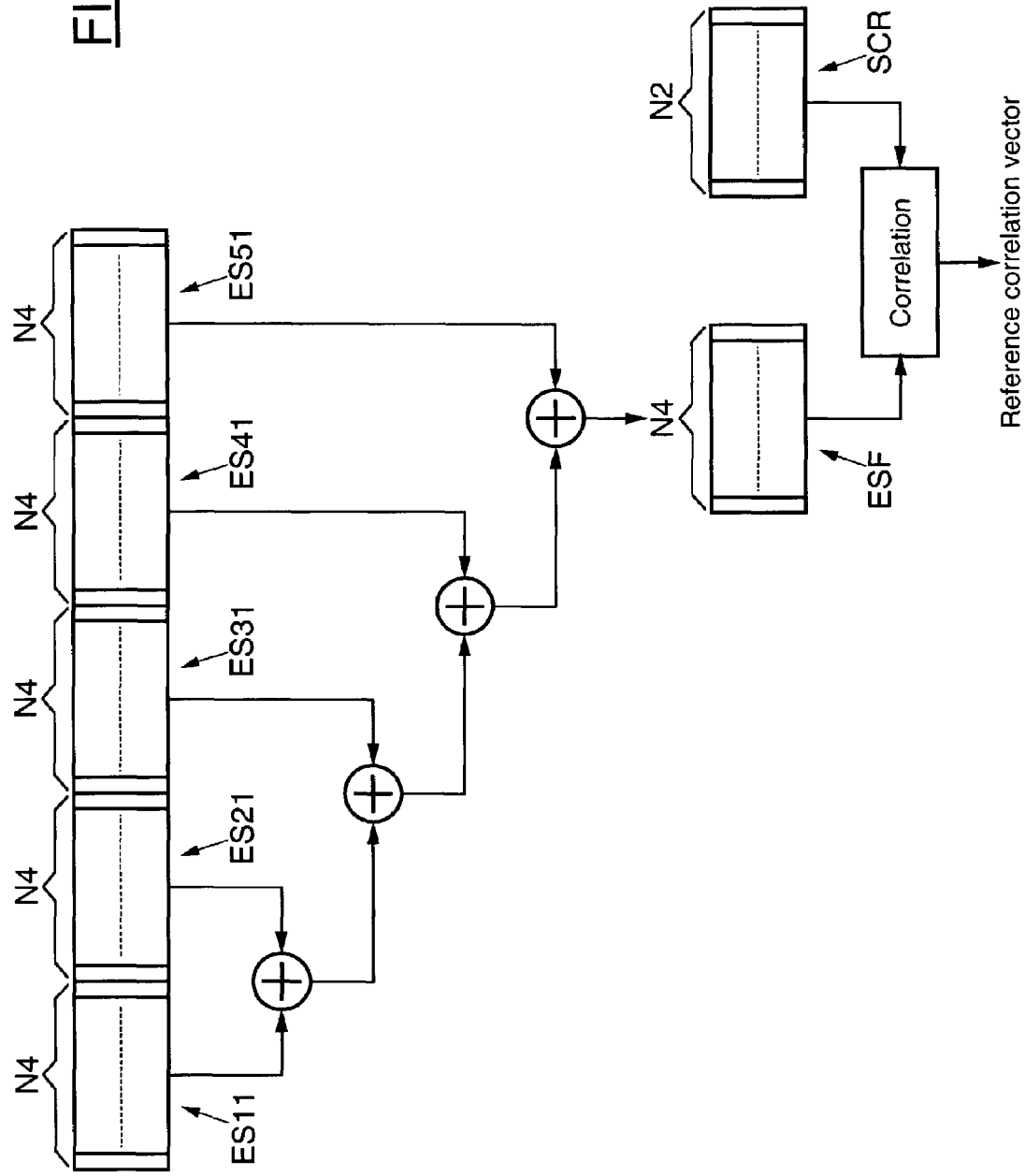

As already indicated above, and since the signal SGNR which arrives at the antenna is noisy, it is preferable for the estimation means to be provided with means MIC for performing a series of coherent integrations of the digital signal. More precisely, as illustrated in FIG. 15, and by analogy with FIG. 13, the means MIC of the estimation means MEST performs summations of common samples of all the sets ES11–ES51 of N4 samples forming the second part P2 of the frame TRA. This is done to obtain a final set ESF of N4 samples over which the correlation means will carry out the sliding correlation with the reference correlation signal SCR. This is done to obtain the reference correlation vector having N4 reference correlation values. The decoding means MDCD will then carry out the decoding of the information contained in the third part P3 of the frame TRA by using the vector of the N4 reference correlation values.

More precisely, this third part P3 of the frame, which is situated ahead of the terminal part P4 of this frame, comprises so called "useful" pulses which will code the useful data to be transmitted. In FIG. 11, just as for the synchronization code CSY and the second part P2, the arrows designate the reference positions pref (FIG. 2) of the pulses in a PPM modulation. Also, the time shift t3 existing between the end of the second part P2 of the frame and the first useful pulse is known very precisely, as are the various time shifts t4 and t5 separating the following pulses.

Figure 16:
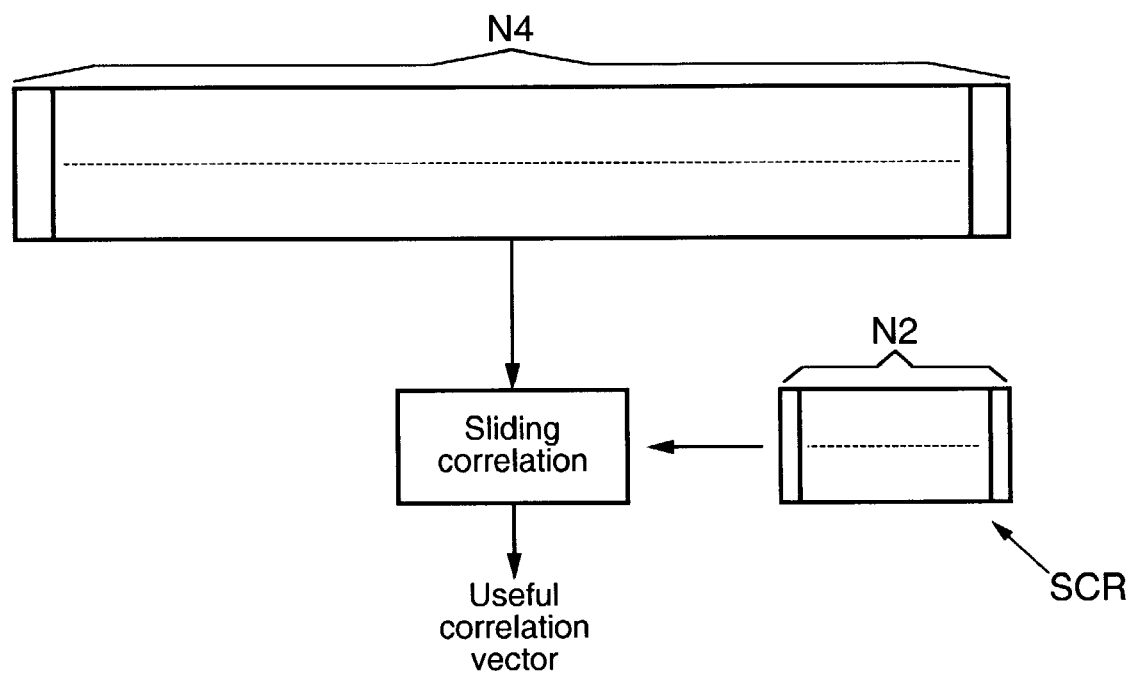
FIG. 16 diagrammatically illustrates a mode of implementation of the data decoding in accordance with the present invention.

Thereafter, the digital processing performed by the decoding means MDCD comprise, beginning at the assumed instant of reception of a current useful pulse, the storage of N4 samples of the digital signal delivered by the sampling means. Then, the correlation means MCORR of these decoding means MDCD performs a sliding correlation between the N4 stored samples and the N2 reference samples (FIG. 16) to obtain a vector of N4 useful correlation values which is associated with this current useful pulse.

Then, the means MDCD compares the useful correlation vector with the vector of N4 reference correlation values temporally delayed or temporally advanced by the shift provided for in a PPM modulation so as to determine the 0 or 1 value of the data item thus coded.

In terms of hardware, the sampling means and the digital processing means can be implemented in CMOS technology, which is beneficial in terms of manufacturing costs. This technology can also be used to provide control means MCTL (FIG. 5) for placing the sampling means and/or the correlation means in a standby state, for example, during periods of time when the system knows it is not receiving any pulses, or even during periods when the signal/noise ratio is not optimal. This leads to an appreciable power savings. Furthermore, the correlation means can be implemented by several correlators in parallel for processing in parallel several groups of N samples so as to obtain a processing speed compatible with the effective sampling frequency equal to N*Fe.

It is also conceivable to perform coherent integrations during the decoding phase if each item of useful information is spread over several pulses. Finally, as far as the coherent integrations are generally concerned, should the successive pulses be spaced apart irregularly in time (for example, according to a known code), the summations of samples c43qan take the time shift between the pulses into account.

The invention claimed is:

1. A method for decoding ultra wideband pulses of of an incident pulse signal, the ultra wideband pulses conveying digital information coded using pulses having a known shape, the method comprising:
   receiving the incident pulse signal and providing a base signal based upon the incident pulse signal;
   providing an intermediate signal representative of a sign of the base signal;

sampling the intermediate signal for providing a digital signal; and digitally processing the digital signal in at least one synchronization phase and in at least one decoding phase by correlating the digital signal with a reference correlation signal, the reference correlation signal corresponding to a reference base signal arising from reception of at least one reference pulse having the known shape.

2. A method according to claim 1, wherein the sign of the base signal is determined relative to a reference signal.

3. A method according to claim 1, wherein the sampling comprises a serial-to-parallel conversion for successively delivering at a delivery frequency Fe groups of N samples in parallel, the delivery frequency Fe corresponding to an effective sampling frequency of the intermediate signal equal to N*Fe.

4. A method according to claim 3, wherein the pulses of the incident pulse signal have a central frequency of a few GHz; and wherein the effective sampling frequency is greater than 10 GHz.

5. A method according to claim 4, wherein N is an integer power of 2; and wherein the effective sampling frequency is about 20 GHz and the delivery frequency Fe is about 200 MHz.

6. A method according to claim 1, wherein the reference correlation signal is made up of reference samples; and wherein the digital processing comprises a sliding correlation between samples of the digital signal and the reference samples.

7. A method according to claim 6, wherein the digital information is conveyed within frames, each frame comprising a synchronization header including at least one segment having a length Ts containing a synchronization code formed by a plurality of reference pulses; wherein the reference correlation signal is made up of a first set of reference samples corresponding to a signal duration equal to Ts and to a reference base signal arising from reception of the synchronization code; and wherein the sliding correlation is performed in the synchronization phase during reception of the synchronization header between the first set of reference samples and a first set of samples of the digital signal corresponding to a signal duration greater than Ts, and detection of the synchronization code is based upon a result of the sliding correlation.

8. A method according to claim 7, wherein the at least one segment in the synchronization header comprises a plurality of segments of the same length Ts, with each segment containing identical synchronization codes; and wherein the digital processing in the synchronization phase further comprises a series of coherent integrations of the digital signal.

9. A method according to claim 1, wherein the incident pulse signal is received via a transmission channel; and wherein the digital processing further comprises a channel estimating phase for estimating a response of the transmission channel, the estimating also comprising correlating the digital signal with the reference correlation signal.

10. A method according to claim 9, wherein the digital information is conveyed within frames, each frame comprising a synchronization header and a second part containing at least one pulse having a known polarity and a known time shift with respect to the synchronization header; wherein the reference correlation signal is made up of a second set of reference samples corresponding to a reference base signal arising from reception of a single reference pulse; and wherein the channel estimating phase comprises:

storing a second set of samples of the digital signal beginning at an instant separated from the synchronization header by a time shift; and performing a sliding correlation between the second set of reference samples and the second set of samples of the digital signal to obtain a vector of reference correlation values.

11. A method according to claim 10, wherein the at least one pulse in the second part of the frame comprises a plurality of pulses having a known polarity spaced regularly apart by a time interval corresponding to the second set of samples of the digital signal; and wherein the digital processing in the channel estimating phase further comprises a series of coherent integrations of the digital signal.

12. A method according to claim 10, wherein the frame further comprises a third part containing a plurality of useful pulses representing transmitted data, with each useful pulse having a known reference time position in the frame; and wherein the digital processing performed in the decoding phase comprises:

storing the second set of samples of the digital signal beginning at an assumed instant of reception of a current useful pulse;

performing a sliding correlation between the stored second set of samples of the digital signal and the second set of reference samples for obtaining a useful correlation vector associated with the current useful pulse; and comparing the useful correlation vector with the vector of reference correlation values, the vector of reference correlation values being delayed or advanced by a predetermined shift.

13. A device for decoding an incident pulse signal of the ultra wideband type, the device comprising:

input means for receiving the incident pulse signal and providing a base signal based upon the incident pulse signal, the incident pulse signal conveying digital information being coded using pulses having a known shape;

preprocessing means connected to said input means for providing an intermediate signal representative of a sign of the base signal;

sampling means connected to said preprocessing means for sampling the intermediate signal for providing a digital signal; and digital processing means connected to said sampling means and comprising synchronization means and decoding means for correlating the digital signal with a reference correlation signal, the reference correlation signal corresponding to a reference base signal arising from reception of at least one reference pulse having the known shape.

14. A device according to claim 13, wherein said preprocessing means has a first input for receiving the base signal and a second input for receiving a reference signal, with the sign of the base signal being determined relative to the reference signal.

15. A device according to claim 13, wherein said sampling means is based upon a serial-to-parallel conversion for successively delivering at a delivery frequency Fe groups of N samples in parallel, the delivery frequency Fe corresponding to an effective sampling frequency of the intermediate signal equal to N*Fe.

16. A device according to claim 15, wherein said sampling means comprises:
- a programmable clock circuit for receiving a base clock signal having the delivery frequency Fe, and for providing N elementary clock signals all having the delivery frequency Fe but temporally shifted by 1/N*Fe with respect to each other;
- a first set of N flip-flops connected to said programmable clock circuit and having respective inputs for receiving the intermediate signal, with each flip-flop being controlled by a respective elementary clock signal, and said first set of N flip-flops providing N samples; and
- an output register connected to said first set of N flip-flops and being controlled by the base clock signal for storing the N samples, and for providing the N samples in parallel at the delivery frequency.

17. A device according to claim 16, wherein said programmable clock circuit comprises a digital phase-locked loop comprising:
- a programmable ring oscillator for providing the N elementary clock signals;
- a second set of N flip-flops connected to said programmable ring oscillator and having respective inputs for receiving the base clock signal, with each flip flop being controlled by a respective elementary clock signal; and
- a control circuit connected to said second set of N flip-flops for receiving the respective outputs therefrom.

18. A device according to claim 15, wherein the pulses of the incident pulse signal have a central frequency of a few GHz; and wherein the effective sampling frequency is greater than 10 GHz.

19. A device according to claim 18, wherein N is an integer power of 2; and wherein the effective sampling frequency is about 20 GHz, with the delivery frequency Fe being about 200 MHz.

20. A device according to claim 13, wherein said sampling means is implemented in CMOS technology.

21. A device according to claim 20, further comprising control means for placing said sampling means and said digital processing means into a standby mode during predetermined time intervals.

22. A device according to claim 13, wherein the reference correlation signal is made up of reference samples; and wherein said synchronization means and said decoding means perform a sliding correlation between the samples of the digital signal and the reference samples.

23. A device according to claim 22, wherein the digital information is conveyed within frames, each frame comprising a synchronization header including at least one segment having a length Ts containing a synchronization code formed by a plurality of reference pulses; wherein the reference correlation signal is made up of a first set of reference samples corresponding to a signal duration equal to Ts and to a reference base signal arising from the reception of the synchronization code; and wherein said synchronization means performs a sliding correlation during reception of the synchronization header between the first set of reference samples and a first set of samples of the digital signal corresponding to a signal duration greater than Ts, and detection of the synchronization code is based upon a result of the sliding correlation.

24. A device according to claim 23, wherein the at least one segment in the synchronization header comprises a plurality of segments of the same length Ts, with each segment containing identical synchronization codes; and wherein said synchronization means performs a series of coherent integrations of the digital signal.

25. A device according to claim 13, wherein the incident pulse signal is received via a transmission channel; and wherein the digital processing means further comprise channel estimation means for estimating a response of the transmission channel, the estimating also comprising correlating the digital signal with the reference correlation signal.

26. A device according to claim 25, wherein the digital information is conveyed within frames, each frame comprising a synchronization header and a second part containing at least one pulse having a known polarity and a known time shift with respect to the synchronization header; wherein the reference correlation signal is made up of a second set of reference samples corresponding to a reference base signal arising from reception of a single reference pulse; and wherein said channel estimation means stores a second set of samples of the digital signal beginning at an instant separated from the synchronization header by a time shift; and performs a sliding correlation between the second set of reference samples and the second set of samples of the digital signal to obtain a vector of reference correlation values.

27. A device according to claim 26, wherein the at least one pulse in the second part of the frame comprises a plurality of pulses having a known polarity spaced regularly apart by a time interval corresponding to the second set of samples of the digital signal; and wherein said channel estimation means further performs a series of coherent integrations of the digital signal.

28. A device according to claim 26, wherein the frame further comprises a third part containing a plurality of useful pulses representing transmitted data, each useful pulse having a known reference time position in the frame; and wherein said decoding means stores the second set of samples of the digital signal beginning at an assumed instant of reception of a current useful pulse, performs a sliding correlation between the stored second set of samples of the digital signal and the second set of reference samples for obtaining a useful correlation vector associated with the current useful pulse, and compares the useful correlation vector with the vector of reference correlation values, with the vector of reference correlation values being delayed or advanced by a predetermined shift.

29. A terminal for decoding an incident pulse signal of the ultra wideband type, the terminal comprising:
- an input for receiving the incident pulse signal and providing a base signal based upon the incident pulse signal, the incident pulse signal conveying digital information being coded using pulses having a known shape;
- an amplifier connected to the input for providing an intermediate signal representative of a sign of the base signal;
- a sampling circuit connected to said amplifier for sampling the intermediate signal for providing a digital signal; and
- a digital processing circuit connected to said sampling circuit for performing a synchronization phase and a decoding phase on the digital signal, said digital processing circuit for correlating the digital signal with a reference correlation signal, the reference correlation signal corresponding to a reference base signal arising from reception of at least one reference pulse having the known shape.

30. A terminal according to claim 29, wherein the incident pulse signals are generated by a wireless transmission system.

31. A terminal according to claim 29, wherein said sampling circuit is based upon a serial-to-parallel conversion for successively delivering at a delivery frequency Fe groups of N samples in parallel, the delivery frequency Fe corresponding to an effective sampling frequency of the intermediate signal equal to N*Fe.

32. A terminal according to claim 31, wherein said sampling circuit comprises:
- a programmable clock circuit for receiving a base clock signal having the delivery frequency Fe, and for providing N elementary clock signals all having the delivery frequency Fe but temporally shifted by 1/N*Fe with respect to each other;
- a first set of N flip-flops connected to said programmable clock circuit and having respective inputs for receiving the intermediate signal, with each flip-flop being controlled by a respective elementary clock signal, and said first set of N flip-flops providing N samples; and
- an output register connected to said first set of N flip-flops and being controlled by the base clock signal for storing the N samples, and for providing the N samples in parallel at the delivery frequency.

33. A terminal according to claim 29, wherein the reference correlation signal is made up of reference samples; and wherein a sliding correlation is performed between the samples of the digital signal and the reference samples in the synchronization phase and in the decoding phase.

34. A terminal according to claim 33, wherein the digital information is conveyed within frames, each frame comprising a synchronization header including at least one segment having a length Ts containing a synchronization code formed by a plurality of reference pulses; wherein the reference correlation signal is made up of a first set of reference samples corresponding to a signal duration equal to Ts and to a reference base signal arising from the reception of the synchronization code; and wherein a sliding correlation is performed in the synchronization phase during reception of the synchronization header between the first set of reference samples and a first set of samples of the digital signal corresponding to a signal duration greater than Ts, and detection of the synchronization code is based upon a result of the sliding correlation.

35. A terminal according to claim 34, wherein the at least one segment in the synchronization header comprises a plurality of segments of the same length Ts and each containing identical synchronization codes; and wherein a series of coherent integrations of the digital signal is performed in the synchronization phase.

36. A terminal according to claim 29, wherein the incident pulse signal is received via a transmission channel; and wherein the digital processing circuit further performs a channel estimation phase for estimating a response of the transmission channel, the estimating also comprising correlating the digital signal with the reference correlation signal.

37. A terminal according to claim 36, wherein the digital information is conveyed within frames, each frame comprising a synchronization header and a second part containing at least one pulse having a known polarity and a known time shift with respect to the synchronization header; wherein the reference correlation signal is made up of a second set of reference samples corresponding to a reference base signal arising from reception of a single reference pulse; and wherein the channel estimation phase stores a second set of samples of the digital signal beginning at an instant separated from the synchronization header by a time shift is stored, and performs a sliding correlation between the second set of reference samples and the second set of samples of the digital signal to obtain a vector of reference correlation values.

38. A terminal according to claim 37, wherein the at least one pulse in the second part of the frame comprises a plurality of pulses having a known polarity spaced regularly apart by a time interval corresponding to the second set of samples of the digital signal; and wherein the channel estimation phase further performs a series of coherent integrations of the digital signal.

39. A terminal according to claim 37, wherein the frame further comprises a third part containing a plurality of useful pulses representing transmitted data, each useful pulse having a known reference time position in the frame; and wherein the decoding phase includes storing the second set of samples of the digital signal beginning at an assumed instant of reception of a current useful pulse, performs a sliding correlation between the stored second set of samples of the digital signal and the second set of reference samples for obtaining a useful correlation vector associated with the current useful pulse, and compares the useful correlation vector with the vector of reference correlation values, with the vector of reference correlation values being delayed or advanced by a predetermined shift.

* * * * *